United States Patent

Strebel et al.

[15] 3,677,107
[45] July 18, 1972

[54] PUSH ROD FOR A CRANK DRIVE MECHANISM

[72] Inventors: Albert Strebel, Binningen; Oskar Habegger, Therwil, both of Switzerland

[73] Assignee: Maschinenfabrik Burckhardt AG, Basel, Switzerland

[22] Filed: June 25, 1970

[21] Appl. No.: 49,762

[30] Foreign Application Priority Data

June 27, 1969 Switzerland..........................9913/69

[52] U.S. Cl. .......................................................74/579 R
[51] Int. Cl. ........................................................F16c 7/00
[58] Field of Search.......................74/579 E, 579; 308/3 CH; 123/197, 197 A, 197 AB, 197 AC

[56] References Cited

UNITED STATES PATENTS 3,238,811  3/1966  Lonstreth.............................74/579 E
2,407,928  9/1946  Herreshoff et al....................74/579 E

FOREIGN PATENTS OR APPLICATIONS 344,047  5/1936  Italy.........................................74/579
7,980  4/1893  Great Britain........................74/579 E Primary Examiner—Meyer Perlin
Assistant Examiner—F. D. Shoemaker
Attorney—Wenderoth, Lind & Ponack

[57] ABSTRACT

A push rod for the crank drive of double-acting piston machines which makes simple and rapid disassembly possible. The shaft portion under the influence of the traction forces set up, is subjected to only relatively light tensile stressing or to compressive stressing. The push rod is secured assembled by anchoring screws with expanding shanks along its entire length and is subjected to alternating stressing, under the influence of a compressive stress which at least partially cancels the tensile stress set up during operation.

13 Claims, 6 Drawing Figures

INVENTORS
ALBERT STREBEL
OSKAR HABEGGER

PUSH ROD FOR A CRANK DRIVE MECHANISM

The invention relates to crank driven double-acting piston machines, for example high-pressure compressors or pumps, and is concerned with a push rod for the transmission of large forces to a crank mechanism having crosshead guiding and having at least one crosshead bearing and a crank pin bearing, and also a central portion connecting the two bearings.

In the case of push rods of known design, at the end facing the crosshead, the fixed or adjustable crosshead journal bearings are fitted in a closed or open push rod (or connecting rod) end.

In the case of open connecting rod ends, the crosshead journal bearing is releasably connected with a bearing cap embracing the bearing bushes or bosses, by means of at least two screws, on the bearing block attached at the shaft end. The crosshead journal bearing may, in the case of the open push rod ends, also be so designed that the bore formed by the bearing cap and the bearing block, for receiving the crosshead journal, is directly lined, by pouring, with bearing metal and machined to the requisite bearing diameter.

At the end of the push rod shaft or stem facing the crankshaft, the securing of the bearing bush halves embracing the crank pin is also effected with a bearing cap or cover loosely connected, by means of at least two screws, with the bearing block also fixedly attached at the shaft or shank end.

For the drive of crossheads having crosshead journals fitted to a central portion of the crosshead body disassembly of the push rod, to monitor the running faces on on both sides, whereby the ends of the said journals project freely on both sides, designs of push rods are known wherein the push rod shaft or shank merges, at the crosshead side, into a fork-shaped head portion embracing the central portion of the crosshead body and serving to receive two crosshead journal bearings.

In the case of the designs or embodiments mentioned, the profile of the push rod shaft is subjected to the full effect of the piston forces whereby tensile and compression stresses are set up in the shaft portion.

The alternating stresses resulting from the tensile and compression stressing exclude, when large forces are concerned, in view of the emergence of stress peaks causing fatigue rupture and due to notching effect, the use for the shaft portion of pourable materials, for example grey cast iron or cast steel, due to the possibility of formation, during pouring, of invisible shrink or pipe holes which act as notches.

The surfaces of the push rod shafts which, conventionally, are manufactured from malleable steel, also require to be well rounded at the points of transition and they require careful surface machining in order to avoid fatigue rupture due to stress peaks resulting from notching effect.

The minimum possible central spacing between the head-side and crank-side bearings is, in the case of push rods of known design, determined by the amount of space required for unhindered installation and dismantling of the bearing cap securing screws, between the bearing blocks projecting beyond the push rod shaft and fixedly connected therewith.

In the case of push rods having a closed push rod attached to the crosshead side, when what are concerned are crossheads having one-part crosshead bodies constituted by two walls, the crosshead pin or journal requires to be installed and extracted from the side and this, especially in the case of heavy designs, requires the use of special auxiliary devices.

However, designs of drive mechanisms are also known wherein the crosshead journal is secured in two-part or multi-part crosshead bodies so that, in order to remove the push rod, it is first of all necessary to dismantle the crosshead body, and this involves a considerable expenditure of time.

It is the primary object of the invention to provide a push rod for the drive of double-acting piston machines which, while being short in structural design, makes simple and rapid disassembly possible and wherein the shaft portion, also under the influence of the traction forces set up, is nevertheless subjected to only relatively light tensile stressing or is subjected to compressive stressing.

According to the invention, this is achieved by the arrangement whereby the push rod is, along its entire length subjected to alternating stressing, under the influence of a compressive stress which at least partially cancels the tensile stress set up during operation.

In order that the invention may be more thoroughly understood, some embodiments will be described in some detail, by way of example, with reference to the accompanying drawings, in which.

Figure 1:
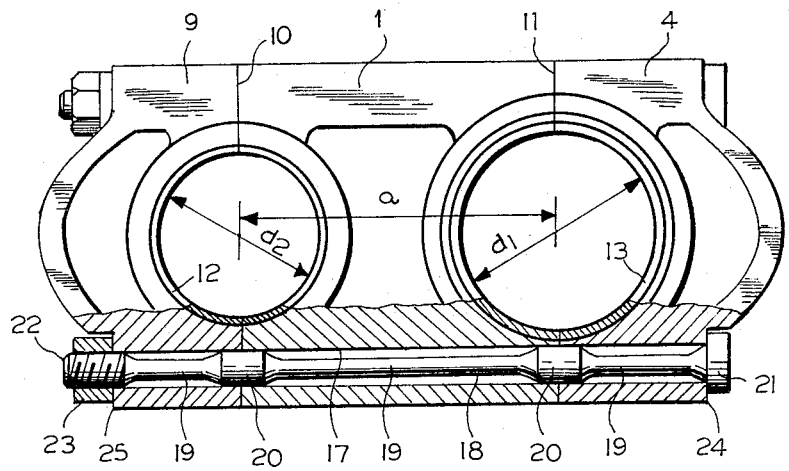
FIG. 1 is a view of the push rod looking towards the bearing.

Referring to FIG. 1, the push rod is, as a dismantlable unit consisting of a central portion 1 constituting the push rod shank, a crank-side bearing cap or cover 4 and a crosshead-side bearing cap or cover 9, so assembled using at least two long anchoring screws 18 that the central portion 1 is firmly secured between the crank-side bearing cap 4 and the crosshead-side bearing cap 9.

The anchoring screws 18, which are provided with expanding shanks 19, are inserted into the bores 17 formed on both sides of the bearing bores $d1$ and $d2$, extending parallel to the center axis with spacing determined from the diameter $d1$ and extending completely through the bearing caps 4 and 9 and the central portion 1. In the zone of the separating gap 10 between the bearing cap 9 and the central portion 1 and the separating gap 11 between the bearing cap 4 and the central portion 1, the anchoring screws 18 are provided, for the purpose of adjusting the separating gaps, with projecting fitting collars 20. The abutment or stop collar 21 fixed to the anchoring screw 18 bears on the abutment face 24 of the crankside bearing cap 4. On the opposite side, the tightening nut 23 which is adapted to be screwed on the screw-thread 22 and bears on the abutment face 25 of the crosshead-side bearing cap 9, so tensions the anchoring screw that the central portion 1 is put into rigid connection with the two outer bearing caps 4 and 9, the exact position of the individual elements relative to each other being determined by the fitting or adjusting collars 20.

Of course, it is also possible so to insert the anchoring screws 18 into the receiving bores 17 that the abutment head 21 passes into abutment on the bearing or abutment face 25 of the crosshead-side bearing cap 9 and the tightening nut 23 passes into abutment on the bearing or abutment face 24 of the crank-side bearing cap 4.

The anchoring screw may also be so designed that, instead of the abutment collar 21, a second tightening nut 23 is screwed into a screwthread provided for this purpose.

Into the receiving bores formed from the bearing blocks of the central portion and of the bearing cap, as crank pin bearings 13, divided, loose bearing bushes having an internal diameter $d1$ and, as crosshead journal bearings 12 divided, loose bearing bushes having the internal diameter $d2$ are inserted, the bearing bushes being, after tightening the bearing caps on both sides via the anchoring screws 18, firmly secured in the receiving bores meanwhile maintaining the running clearance in the sliding bores $d1$ and $d2$.

It is, however, also possible, instead of the loose bearing bushes, to firmly connect bearing metal, by direct pouring-in, with the receiving bores, in which case the finish-machining of the bearing bores $d1$ or $d2$ is effected with the push rod assembled.

The spacing $a$ between the bearings, and therewith the total structural length of the push rod, may with this arrangement be kept extremely small, being determined merely by the constructionally determined thickness 16 of the web in the central portion 1 between the bearing bores.

Figure 2:
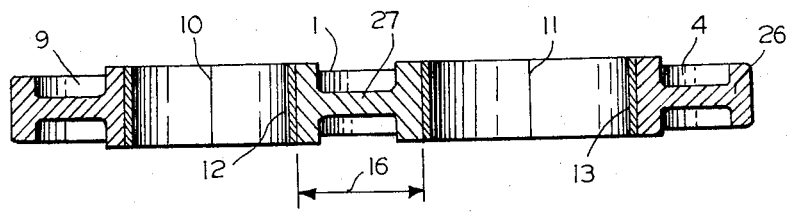
FIG. 2 shows the single push rod, in section through the bearings.
Figure 3:
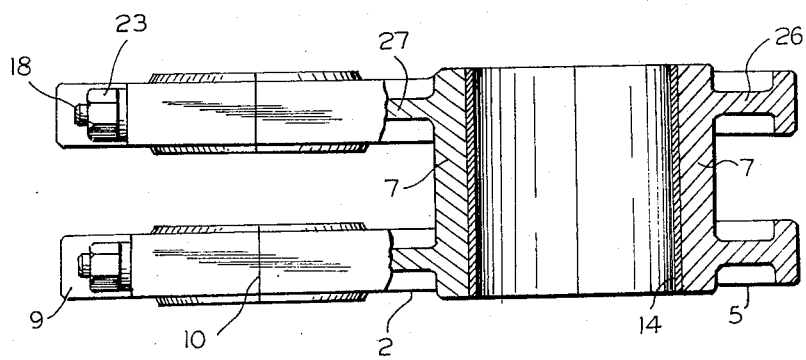
FIG. 3 shows the arrangement of a double push rod, as seem from above, the two push rods being put into a state of rigid connection by means of a tubular connecting element on the crank pin bearings.
Figure 4:
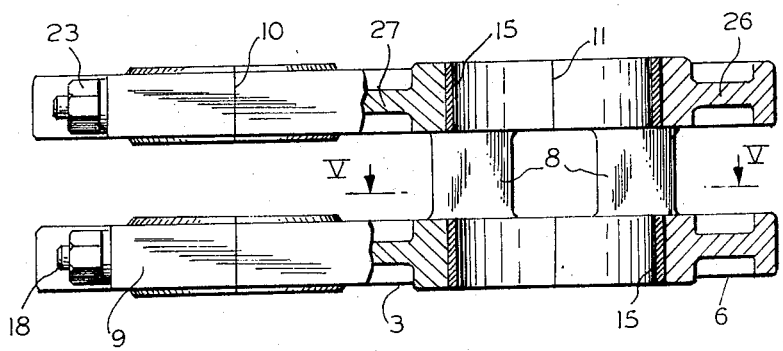
FIG. 4 shows another double push rod, as seen from above, the two push rods being put into rigidly connected relationship by means of rib-shaped connecting elements on the crosshead journal bearing.
Figure 5:
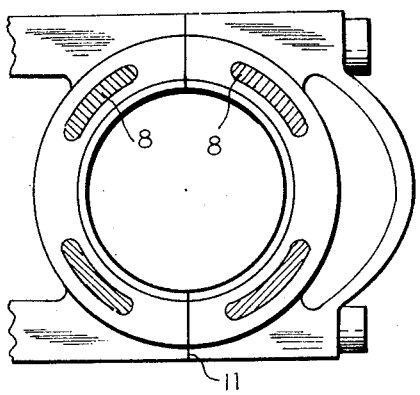
FIG. 5 shows a section along section line V—V through the rib-shaped connecting elements of the double push rod shown in FIG. 4.

The push rods may, as shown in FIG. 2, be designed as simple push rods or, as shown in FIGS. 3 and 4, be designed as rigidly connected double push rods.

In the case of the push rod shown in FIG. 3, the central portion 2 containing the bearing blocks consists of two parallel-arranged shank portions 27 rigidly connected through the agency of a semi-tubular connecting element 7. On the crank-side, the crank pin bearing 14 having internal diameter $d1$ is installed, with a length corresponding to the double push rod width, with a bearing cap 5 consisting of a semi-tubular portion 7 rigidly connected with the lateral yoke elements 26. In the assembled condition, the semi-tubular portion 7 of the central portion 2 and the semi-tubular portion 7 of the crank-side bearing cap 5 constitute the bore for receiving the divided, loose bearing bushes or brasses 14 or for receiving the metal poured lining for the crank pin bearing, which is machined to correspond to the necessary bore dimensions $d1$.

At the crosshead side, the receiving bores for the two two-part bearings 14 or for the metal poured lining are formed by fitting the bearing cap 9.

In the case of the push rod shown in FIG. 4, the central portion 3 containing the bearing blocks comprises two parallel-arranged shank portions 27 rigidly connected together through the agency of one or more rib-shaped webs 8. At the crank side, two crank pin bearings 15 having a length corresponding to the receiving bore having the internal diameter $d1$ are installed jointly with a bearing cap 6. The bearing cap 6 consists of two bearing covers associated with the shank parts 27 and rigidly connected with one or more rib-shaped webs 8.

However, it is also possible, instead of a bearing cap unit consisting of two bearing caps or covers connected by webs 8, to fit two individual bearing caps which are not connected with each other.

In the assembled condition, the two loose, divided bearing bushes 15 are inserted into, or the bearing metal is permanently poured into, the axially arranged bores produced after fitting of the bearing cap 6.

The two cross-head side bearing caps 9, the central portion 2(FIG. 3) and 3(FIG. 4) and the crank-side bearing cap 5 (FIG. 3) and 6 (FIG. 4) are rigidly connected, to constitute a releasable unit, with the anchoring screws 18 inserted into the receiving bores 17 in the portions of the two shank sides. The advantage of the push rod arrangement disclosed relatively to the conventional arrangement resides in the fact that, due to the long anchoring screws 18 connecting the two bearing caps, the central portion 2(FIG. 3) and 3 (FIG. 4) serving as a shank may be subjected to compressive stressing the value of which may be determined by the prestressing or biasing force capable of being produced in the expansion shank 19 through the agency of the tightening nut 23. With the arrangement of the anchoring screws 18, during the traction movement of the push rod, the effective tensile stresses are shifted on to the continuously extending-through anchoring screws 18, and, if the prestressing force is appropriately selected, the central portion 1(FIG. 2) or 2 (FIG. 3) or 3(FIG. 4) still remain subjected to the influence of the compressive stresses. In this way, the alternating stressing set up in the central portions is entirely shifted into the pressure zone, whereby it is made possible to use also pourable materials, for example grey cast iron or cast steel, for the central portions, in this way achieving special advantages from the viewpoint of manufacture.

Since the anchoring screws 18 may be designed to have an extremely long, effective expansion length in the shank 19, the alternating stressing set up in the screwthread 22 and in the shank 19 may be kept within relatively low limits.

Figure 6:
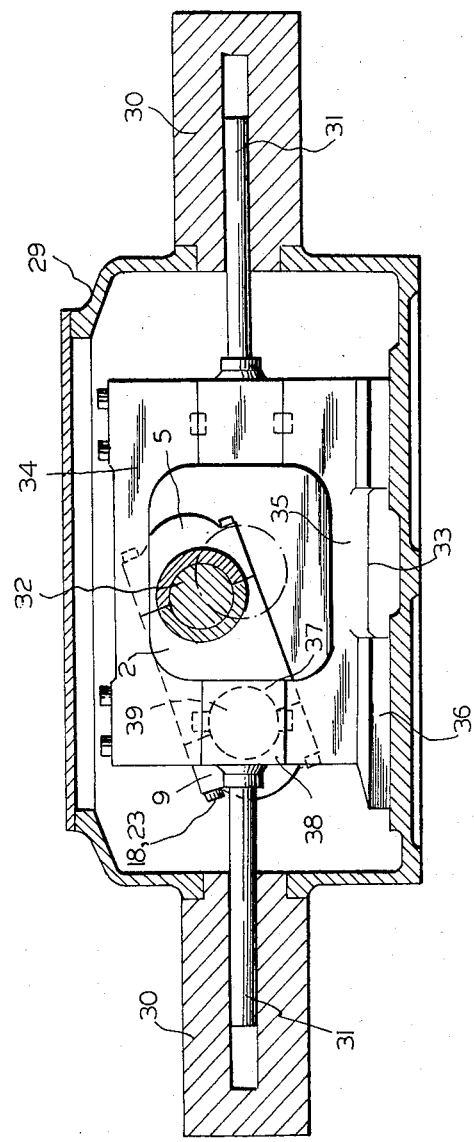
FIG. 6 illustrates the installation of a double push rod in a frame-shaped crosshead device.

A further advantage consists in the fact that the push rod may be designed to have a short structural length. This advantage is especially evident in the case of the use, illustrated in FIG. 6, of double push rods according to what is illustrated in FIGS. 3 and 4, for the drive of frame-shaped crosshead devices 33 for mechanically driven crank drive mechanisms wherein, disposed opposite each crank on the drive mechanism frame 29, there are arranged two working cylinders 30 for receiving the pistons 31. Frame-shaped crosshead devices 33 are known, wherein there are rigidly secured, between an upper and lower connecting members 34 or 35, a crosshead journal or pin element 37 having a block-shaped central portion 38 and guide pins 39 rigidly secured on both sides. In order to keep the structural length of the crosshead journal frame as short as possible, if only in view of the inertia force effect and buckling or collapsing stressing due to the force effect in the connecting elements 34 and 35, it is necessary to design the push rod displaceable within the crosshead frame 33 to be as short as possible.

In the case of the double push rod according to FIGS. 3 and 4, the two shaft ends with the crosshead journal bearings 12 (FIG. 1) are articulated to the two crosshead journals 39 rigidly secured on the block-shaped central portion 38(FIG. 6) of the crosshead journal member 37 and, at the same time, the crank pin bearing 14(FIG. 3) or the two crank pin bearings 15 (FIG. 4) are articulated with the aid of the bearing cap to the crank pin 32 of the crank shaft, with which arrangement, after tightening the anchoring screws 18, the double push rod represents a displaceable unit. In this connection, it is advantageous that the tightening of the nuts 23 on the screwthread 22 of the anchoring screws 18 may be effected from an accessible push rod side, for example from the side of the crosshead-side bearing cap 9, above all when it is necessary to use hydraulic tightening devices for the tightening of the anchoring screws 18.

Due to the tightening of the nuts 23 from only one side, it also becomes possible, without complete disassembly of the push rod, to monitor for the running faces on the bearing bushes 12 and 13(FIG. 2) or 14 (FIG. 3) or 15(FIG. 4), this being something which is especially important, above all in view of the saving of time achievable therewith.

It is a further advantage that, when using crosshead journal elements 37 which are resistant to bending and which have the design shown (whereby the use of large-diameter crosshead journals is entirely possible, with a short structural length) the diameters $d2$ of the crosshead journal bearings in the push rod may be satisfactorily adapted, this being especially important precisely for the transmission of large forces.

We claim:

1. A push rod for a crank drive mechanism having crosshead guiding comprising at least one crosshead bearing, a crank pin bearing, a central shank connecting said two bearings and means subjecting said push rod along its entire length to alternating stressing under the influence of compressive stressing which at least partially cancels-out the tensile stressing set up during operation.

2. A push rod according to claim 1 wherein two bearing caps are pressed on both sides against said shank by at least two anchoring screws extending through said central shank.

3. A push rod according to claim 2 wherein the assembled push rod has bores extending on both sides parallel to and equally spaced from the central axis of said push rod, through the crosshead-side bearing cap, said central shank and the crank-side bearing cap and said anchoring screws securing the crosshead-side bearing cap and the crank-side bearing cap being removably inserted in said bores.

4. A push rod according to claim 2 wherein said anchoring screws each have expansible shank portions.

5. A push rod according to claim 3 wherein said anchoring screws each have a cylindrical collar mating said bore in the zone of the separating gaps between said bearing caps and said shank whereby the exact position of the elements constituting said push rod is determined on tightening said anchoring screws.

6. A push rod according to claim 1 wherein said push rod is a double push rod assembled to constitute a unit from two crosshead-side bearing caps, a central shank containing said bearings and provided with two shanks and a crank-side bearing cap.

7. A push rod according to claim 6 wherein said shanks extend parallel on both sides of the push rod and are rigidly connected by means of a semi-tubular element.

8. A push rod according to claim 7 wherein said semi-tubular element and said shanks together constitute the bearing for receiving a cast-in crank pin bearing.

9. A push rod according to claim 6, wherein said shanks extending parallel on both sides are rigidly connected by means of at least one rib-shaped web.

10. A push rod according to claim 6 wherein yokes extending parallel on both sides on the crank-side bearing cap are rigidly connected with said anchoring bores and the abutment faces by means of a semi-tubular member.

11. A push rod according to claim 10 wherein said semi-tubular element and said yokes constitute the bearing cap for receiving a cast-in crank pin bearing.

12. A push rod according to claim 10 wherein said yokes on both sides of the crank-side bearing cap are rigidly connected by means of at least one rib-shaped web.

13. A push rod according to claim 10 wherein the two shanks of the central portion are connected by ribs and the two single, unconnected bearing caps are rigidly connected by means of said anchoring screws.

* * * * *